Aug. 31, 1937. W. C. ANTHONY ET AL 2,091,698
CYCLE CONSTRUCTION
Filed May 2, 1936
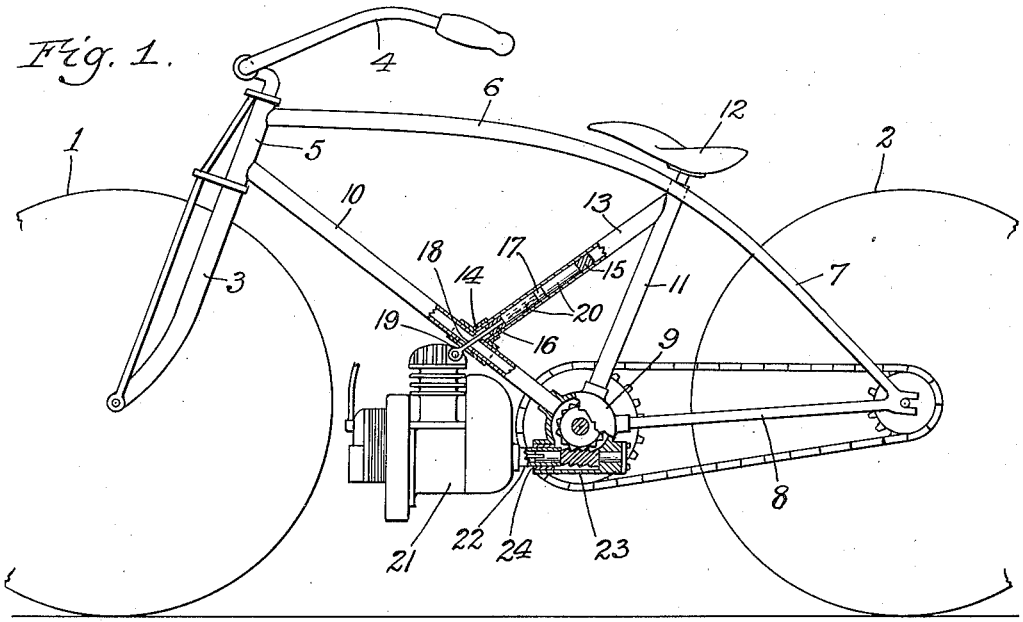
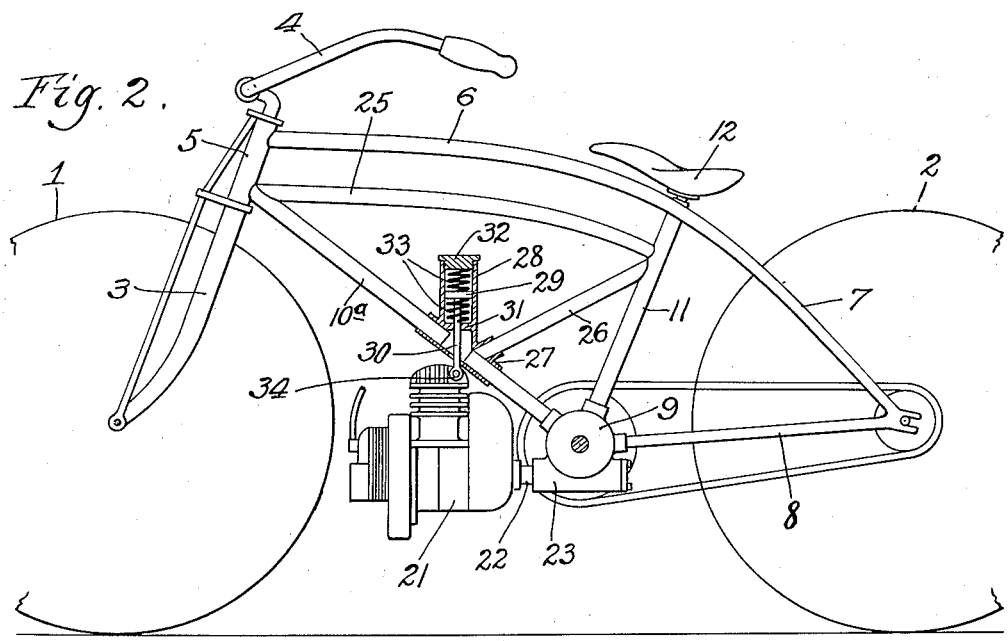
Inventors
William C. Anthony
Lester Wachter
by Parker + Carter
Attorneys.

Patented Aug. 31, 1937

2,091,698

UNITED STATES PATENT OFFICE 2,091,698

CYCLE CONSTRUCTION

William C. Anthony and Lester Wachter, Streator, Ill., assignor to Anthony Development Company, Streator, Ill., a syndicate Application May 2, 1936, Serial No. 77,504

12 Claims. (Cl. 180—33)

This invention relates to a vehicle, particularly to a bicycle having a motor for driving it. It is to be considered not so much as a motor cycle but rather as a bicycle with power, the motor being relatively very light and small and intended primarily for economy and relatively slow speeds.

An object of the invention is to provide a frame so shaped and braced as to be strong enough to carry the motor and to resist breaking. Another object is to provide means in connection with the frame of a vehicle of the type indicated for mounting the motor, to protect the frame and to absorb as large a proportion as possible of the vibration and destructive energy resulting from the operation of the motor.

Other objects will appear from time to time in the specification and claims.

The invention is illustrated more or less diagrammatically in the accompanying drawing, wherein:—

Figure 1 is a side elevation with parts broken away and parts in section, showing one form of the invention;

Figure 2 is a similar view showing a modified form.

Like parts are designated by like characters throughout the specification and drawing.

A steering wheel 1 and a drive wheel 2 are supported from suitable axles not shown in detail, as their details form no essential part of the present invention. The front wheel is carried in a fork 3 provided with handle bars 4 by means of which it may be turned to steer the vehicle. The fork is mounted in a frame which comprises a forward section 5 and an upper section 6 which may be split to provide side members 7 between which the rear or driving wheel 2 is mounted. A lower and generally horizontal section of the frame is formed by side bars 8 which are secured at one end to the side bars 7 and at their forward end to a housing 9. A forwardly inclined bar 10 runs from the housing 9 to the front frame member 5. A rearwardly and upwardly inclined member 11 runs from the housing 9 to the upper frame member 6 and may carry or have positioned generally above it a seat 12.

In the form shown in Figure 1 the rearwardly and upwardly inclined frame member 13 is secured at its upper end to the member 11 or to the member 6 and at its lower end is secured to a fitting 14 which embraces the frame member 10 intermediate its ends. Positioned within the member 13 is a solid stop 15 and a perforated stop 16. A piston 17 is positioned between these stops. The piston rod 18, which is secured to the piston 17 extends outwardly through a suitable perforation in the frame member 10 and the fitting 14, terminates in an eye or other similar member 19 to which a motor is secured. On either side of the piston 17 is a section of yielding material 20 which may be rubber, springs or any other yielding material which yieldingly resists movement of the piston in either direction.

A motor 21 of any suitable design is secured to the eye 19. At its rear end the motor carries a sleeve 22 through which the driving shaft extends. A sleeve-like portion 23 of the housing 9 embraces the sleeve 22 and a rubber or other yielding member 24 is positioned about the sleeve 22, is gripped by the sleeve 23 and furnishes a yielding support for the motor at that end.

In the form shown in Figure 2 a forwardly inclined member 10a, generally similar to the member 10, of Figure 1 is used; and an additional upper frame member 25 is provided. An upwardly and rearwardly inclined frame member 26 is secured to the member 11 adjacent its point of juncture with the member 25. At its lower end it is secured to a housing 27 which joins the frame member 10. Preferably integrally with the member 27 is a housing 28 which has a piston 29. 30 is a piston rod secured to the piston 29. 31 is a stop within the housing 28. 32 is a removable closure for the upper end of the housing. 33, 33 are springs positioned within the housing, one being on either side of the piston 29. The piston rod 30 terminates in an eye 34 or similar member to which the motor 21 is attached. At its rear the motor is secured to the housing 9 within the sleeve 23 in the manner described above in connection with Figure 1.

A chain drive is shown for the rear or driving wheel 2. The details of this will not be described further as they form no essential part of the present invention and any other form of drive might be substituted.

It has been found in devices of this sort that the vibrations of the motor tend to break or otherwise damage the frame members. Hence it is a purpose of this invention, both to strengthen the frame and to provide means for partially or wholly cushioning and absorbing the vibration and jar of the motor. As a frame strengthening means the frame member 13 or 26 of Figures 1 and 2, respectively, is provided. These members strengthen and stiffen the frame member 10. In general the vibratory motion of the motor is about a center which approximates its point of attachment to the housing 9 or more particularly to the sleeve 23. The frame members 13 or 26 are positioned so as to be approximately tangent to the arc of that motion, and thus there is opposed to that motion a stiff member which is approximately perpendicular to the radius of the motion and so resists it far better than it can be resisted by the frame member 10 alone, which is not stiff in the direction of that motion. By having the frame member 13 or 26 terminate at or near the upper apex of the triangular portion formed by the members 7, 8 and 11, the members 13 and 26 are thus anchored at the rigid apex of a triangle and hence have a rigid support.

In addition to this stiffening of the frame the relatively flexible or shock absorbing mounting takes up and cushions a large part of the motion of the motor. By mounting the rubber or similar sleeve 24 at the point of contact of the motor with the housing 9, a shock absorbing connection is provided. This connection is not only shock absorbing but also permits limited movement so that no strains are set up between the motor and the housing 9 when the inevitable motion between the two occurs.

To support and cushion the upper end of the motor the piston 18 or 30 is provided. Both of these pistons are provided with shock absorbing mountings. In either case these mountings may be of rubber or springs or pneumatic or hydraulic cushions and they further relieve the frame as a whole and particularly the frame member 10 of vibration, shock and jar incident to the motion of the motor. In the form shown in Figure 1 the movement of the piston 17 is along the axis of the frame member 13 and thus along a line which is generally perpendicular to the radius of movement of the motor. In the form shown in Figure 2 the movement of the piston 29 is along a line not truly tangent to the arc of movement of the motor but it is close enough to it to have an effective cushioning result.

We claim:

1. In a bicycle frame, a plurality of frame members, such members defining a generally triangular section, a forwardly and upwardly inclined member extending from said triangle, a motor suspended at one point from said triangle, said motor lying generally below said forwardly and upwardly inclined member and extending forwardly, means interposed between the motor and the triangle adjacent said point to permit relative movement of the two, a rearwardly and upwardly inclined member extending from a point intermediate the ends of said forwardly inclined member to an upper portion of said triangle, and cushion means, carrying said motor at a second point separate from said first mentioned point of attachment to said frame.

2. In a bicycle frame, a plurality of frame members, such members defining a generally triangular section, a forwardly and upwardly inclined member extending from said triangle, a motor suspended from said triangle at one point, means interposed between the motor and the triangle adjacent said point to permit relatively approximately pivotal movement of the two, a rearwardly and upwardly inclined member extending from a point intermediate the ends of said forwardly inclined member to an upper portion of said triangle, and cushion means, said means carrying said motor at a second point separate from said first mentioned point of attachment to said frame, said rearwardly inclined member being disposed generally tangent to the arc of movement of said motor.

3. In a bicycle frame, a plurality of frame members, such members defining a generally triangular section, a forwardly and upwardly inclined member extending from said triangle, a motor suspended at one point from said triangle, means interposed between the motor and the triangle adjacent said point to permit relative movement of the two, a rearwardly and upwardly inclined member extending from a point intermediate the ends of said forwardly inclined member to an upper portion of said triangle, and cushion means positioned upon the fame and adjacent the juncture of said forwardly inclined and said rearwardly inclined members, said cushion means carrying said motor at a second point separated from said first mentioned point of attachment to said frame.

4. In a bicycle frame, a plurality of frame members, such members defining a generally triangular section, a forwardly and upwardly inclined member extending from a lower corner of said triangle, a motor movably suspended from said lower corner for substantially pivotal movement with respect thereto, a rearwardly and upwardly inclined member extending from a point intermediate the ends of said forwardly inclined member toward an upper corner of said triangle, and cushion means in said rearwardly inclined member, said means carrying said motor, said rearwardly inclined member being disposed generally tangent to the arc of movement of said motor.

5. In a bicycle frame, a plurality of frame members, such members defining a generally triangular section, a forwardly and upwardly inclined member extending from a lower corner of said triangle, a motor suspended from said lower corner, a rearwardly and upwardly inclined member extending from a point intermediate the ends of said forwardly inclined member toward an upper corner of said triangle, and cushion means in said rearwardly inclined member, said means carrying said motor.

6. In combination in a bicycle frame, a plurality of frame members defining a generally triangular section, said section positioned with its base down, a housing secured to said base, a forwardly and upwardly inclined member secured at its lower end to said housing, a motor movably secured to said housing and also supported on said forwardly inclined member at a point intermediate its ends, and a stiffening member secured at its forward end to said forwardly inclined member, and at its rear end to said triangle.

7. In combination in a bicycle frame, a plurality of frame members defining a generally triangular section, said section positioned with its base down, a housing secured to said base, a forwardly and upwardly inclined member secured at its lower end to said housing, a motor movably secured to said housing and also supported on said forwardly inclined member at a point intermediate its ends, and a stiffening member secured at its lower end to said forwardly inclined member, and at its upper end to said triangle at approximately its apex.

8. In combination in a bicycle frame, a plurality of frame members defining a generally triangular section, said section positioned with its base down, a housing secured to said base, a forwardly and upwardly inclined member secured at its lower end to said housing, a motor secured to said housing and also supported at a point intermediate the ends of said forwardly inclined member, and a stiffening member secured at its lower end to said forwardly inclined member, and at its upper end to said triangle at approximately its apex, shock absorbing means within said stiffening member, the motor being secured to said shock absorbing means.

9. In combination in a bicycle frame, a plurality of frame members defining a generally triangular section, said section positioned with its base down, a housing secured to the forward end of said base, a forwardly and upwardly inclined member secured at its lower end to said housing, a motor yieldingly secured to said housing and also supported at a point intermediate the ends of said forwardly inclined member, and a stiffening member secured at its lower end to said forwardly inclined member and at its upper end secured at approximately the apex of said triangle, shock absorbing means within said stiffening member, the motor being secured to said shock absorbing means.

10. In combination in a bicycle frame, a plurality of frame members, some of said frame members defining generally a triangle positioned with its base substantially horizontal, a motor housing flexibly secured to a forward corner of said triangle, a forwardly and upwardly inclined frame member extending from said housing, an upwardly and rearwardly inclined stiffening member positioned with one end intermediate the ends of said forwardly inclined member and secured at its other end adjacent the apex of said triangle, the motor housing movably secured at a point intermediate the ends of said forwardly inclined member.

11. In combination in a bicycle frame, a plurality of frame members, some of said frame members defining generally a triangle positioned with its base substantially horizontal, a motor housing flexibly secured to a forward corner of said triangle, a forwardly and upwardly inclined frame member extending from said housing, an upwardly and rearwardly inclined stiffening member positioned with one end intermediate the ends of said forwardly inclined member and secured at its other end adjacent the apex of said triangle, the motor housing movably secured at a point intermediate the ends of said forwardly inclined member, cushion means positioned intermediate the ends of said forwardly inclined member, said means attached to the motor, said cushion means providing a shock absorbing mounting for said motor, said rearwardly extending member providing a stiffening means for said forwardly inclined member.

12. In a bicycle frame, a plurality of frame members, such members defining a generally triangular section, a forwardly and upwardly inclined member extending from a lower corner of said triangle, a motor yieldably suspended from said lower corner, a member secured to a point intermediate the ends of said forwardly and upwardly inclined member, extending rearwardly to said triangle, a cushion means at the point of attachment of said rearwardly extending member to said forwardly inclined member, said cushion means secured to the motor and supporting it in part for yieldable motion.

WILLIAM C. ANTHONY.
LESTER WACHTER.